United States Patent Office 3,002,743
Patented Oct. 3, 1961

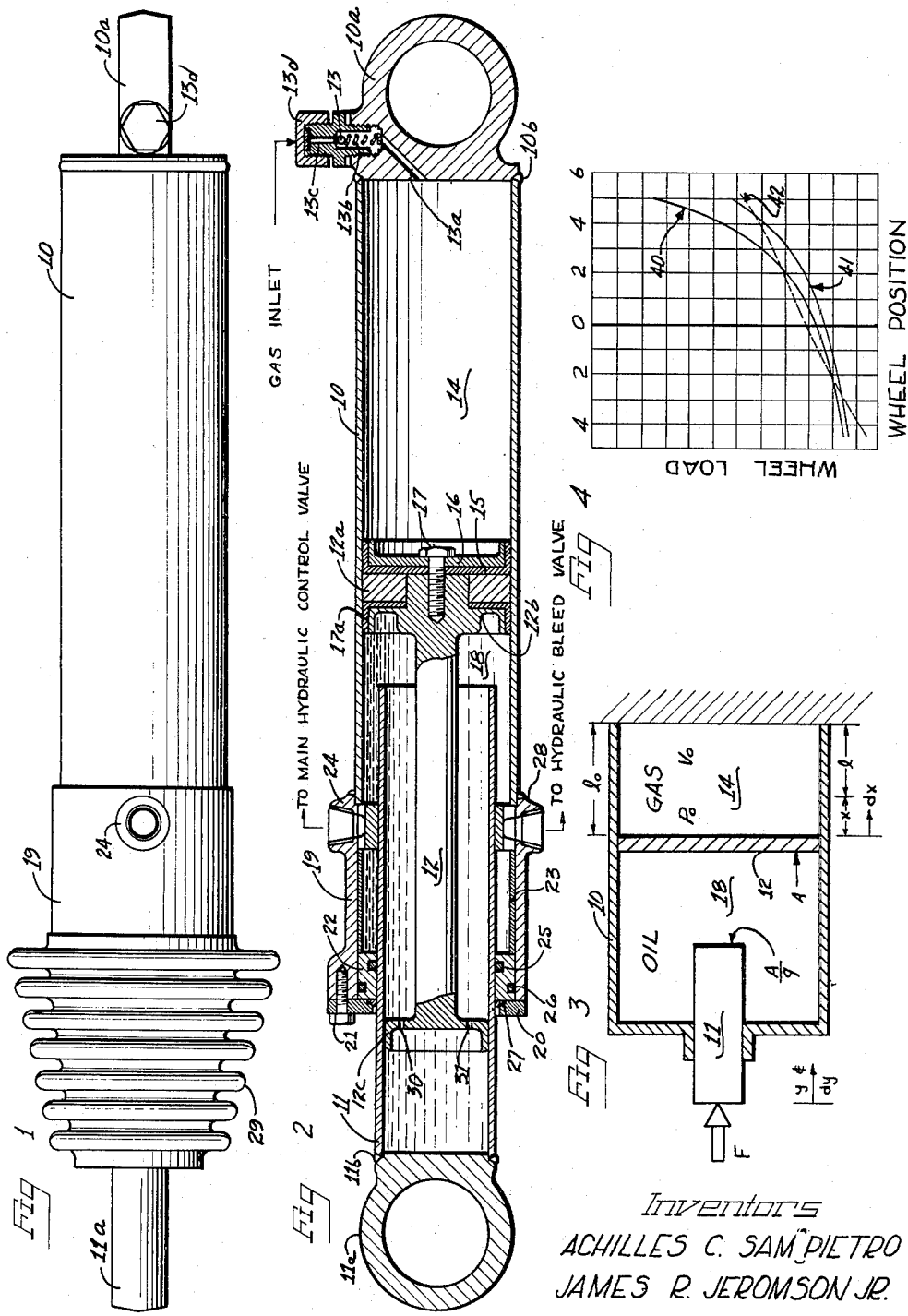

3,002,743
HYDRO-PNEUMATIC STRUT
Achilles C. Sampietro, Detroit, Mich., and James R. Jeromson, Jr., Willoughby Hills, Ohio, assignors to Thompson Ramo Wooldridge, Inc., a corporation of Ohio
Filed Sept. 2, 1958, Ser. No. 758,487
2 Claims. (Cl. 267—64)

This invention relates to a vehicle suspension unit. More particularly, this invention relates to a hydro-pneumatic strut suitable for use in the suspension and leveling systems of vehicles such as trucks, tractor-trailers, automobiles, airplanes and the like.

While many suspension and leveling systems for vehicles have in the past been developed, it is an object of the present invention to provide for such a system a hydro-pneumatic strut or suspension unit which is simple and fool-proof in construction, maintenance and operation, which affords over all weight saving by elimination of separate shock absorbers, and which at the same time affords desirable riding characteristics to the vehicle and permits a flexibility of adjustment and operation heretofore unattainable. It is a feature of the present invention to provide a hydro-pneumatic strut comprising an upper or main cylinder in which a body of compressed air serves as an air spring or cushion for a floating piston in the cylinder. The lower end of the floating piston rides within a cylindrical ram which is coaxially and telescopically arranged within the first cylinder and within a variable volume hydraulic oil chamber defined by the upper end of the floating piston in the first cylinder. The lower end of the floating piston is provided with a damper member seated in the cylindrical ram and having restricted orifices or hydraulic fluid circulating apertures which provide a damping or shock absorbing effect. The device is thus a hydro-pneumatic suspension unit with a differential piston and a damper in series with the air spring. Since the floating piston moves only a fraction of the ram's motion, the volume between the ram and the floating piston varies. This provides the required oil transfer through the above mentioned orifices to provide the damping effect. Since the damping force is in series with the main spring rather than in parallel with it, it has been found possible to use essentially critical damping without the impairment of good riding characteristics which results when critical damping is used in a parallel shock absorber arrangement. The device may readily be constructed so as to provide full wheel travel under all load conditions. The nonlinear characteristic of the pneumatic spring provides a soft ride for small wheel deflections. However, for larger wheel movements, the spring rate increases rapidly preventing strike through to the stops. This feature reduces the shock loading of the vehicle structure and cargo. At the same time, the need for separate shock absorbers is eliminated.

It is therefore an object of this invention to provide a hydro-pneumatic strut for a vehicle suspension system.

It is a further object of this invention to provide a hydro-pneumatic strut having a differential piston and a damper in series with an air spring.

It is a further object of this invention to provide such a hydro-pneumatic strut for a vehicle suspension system wherein critical damping is provided by a damper in series with a differential piston and spring.

It is a further object of this invention to provide such a hydro-pneumatic strut for a vehicle suspension system which eliminates the need for separate shock absorbers.

It is a still further object of this invention to provide such a hydro-pneumatic strut for a vehicle suspension system wherein the non-linear characteristics of the pneumatic spring provides a soft ride for small wheel deflections and wherein the spring rate increases rapidly for larger wheel deflections.

Other objects, features and advantages of the present invention will be more fully apparent from the following detailed description taken in connection with the accompanying drawings in which like reference characters are used to refer to like parts throughout and wherein:

FIGURE 1 is a side elevational view of the hydro-pneumatic strut of the present invention.

FIGURE 2 is a central axial longitudinal sectional view of the apparatus shown in FIGURE 1.

FIGURE 3 is a schematic diagram used in a theoretical analysis of the characteristics of the strut.

FIGURE 4 is a graph showing a load-deflection curve in which wheel deflection in any convenient unit such as inches is plotted as a function of wheel load in pounds for a wheel supported by a strut having characteristics typical of those attainable by means of the concepts of the present invention.

Turning now to the drawings and in particular to FIGURES 1 and 2 thereof, there is shown a hydro-pneumatic strut in accordance with the present invention comprising a first or outer cylinder or housing 10, a second or inner cylinder or ram 11 coaxially and telescopically arranged for axial movement within the first cylinder 10 so as to act as a ram. A floating differential piston 12 seats at one end against the inner bore of the first or outer cylinder 10 and at the other end against the inner bore of the second or inner cylinder 11. A ring member 11a is rigidly attached to the external end of cylinder 11 in any convenient manner the joint therebetween being preferably sealed as at 11b. The ring member 11a is adapted to connect the hydro-pneumatic strut to spherical bearings by which it may be attached to the lower control arm of the wheel of a vehicle. A similar ring member 10a is joined rigidly to the opposite end of the first or outer cylinder 10 and the joint is similarly sealed as at 10b. The ring member 10a is adapted to connect the upper end of the hydro-pneumatic strut to spherical bearings by which it is attached for universal movement to the frame or sprung mass of the vehicle.

An air inlet valve 13 of the ball check type is positioned in the end member 10a and communicates through a passage 13a with the chamber 14 formed by cylinder 10, end ring member 10a, and the end member 12a of the floating piston 12. Ball valve 13 is biased by a spring 13b to seat against the outlet of a passage 13c through which air under pressure from any convenient source may be admitted to the chamber 14 when the cap 13d of the air inlet valve is removed. The compressed air thus admitted to the chamber 14 acts as a non-linear spring in the hydro-pneumatic strut.

A sealing member 15 is interposed between the end or partition member 12a of piston 12 and a retaining member 16 shaped so that the sealing member 15 contacts the sides of cylinder 10. A machine screw 17 extends through the retaining member 16 into the piston 12 so as to hold the retaining member 16, sealing member 15, and end member 12a securely in position against a flange or lip extension 12b of the piston 12. A second sealing member 17 is interposed between flange 12b and the annular end member 12a. This sealing arrangement at the upper end of the floating piston 12 separates the air or gas charge in chamber 14 from the hydraulic oil in a chamber 18 on the other side of the seal in order to prevent emulsification of the hydraulic oil by the gas.

The chamber 18 is formed by the walls of the cylinder 10 to the end of which is welded or otherwise rigidly attached an extension cylinder 19. Cylinder 19 is provided with an end plate 20 which may be attached to enlarged portions of the cylinder 19 by a plurality of machine screws 21. A sealing member 22 is held against end plate 20 by an annular spacer 23 which is attached to the inner surface of cylinder 19 and extends up to a hydraulic inlet 24. O-rings 25, 26 and 27 are positioned in the sealing member 22 in order to seal the hydraulic fluid in chamber 18 while permitting motion of ram 11 into and out of the chamber 18. This O-ring type seal at the lower end of the strut is subjected to essentially the same duty cycle as the seal in a conventional shock absorber. However, the seal is preferably designed to leak slightly in order to provide a film of oil on the sealing surface to prevent burning of the seal. A small amount of leaking at this point is beneficial and can be tolerated since the oil supply to chamber 18 is, in the intended system applications, automatically replenished simply by operating a hand controlled valve. It will of course be understood, however, that this leakage is not essential and that a completely tight seal may be provided if desired.

Opposite the main hydraulic fluid or oil inlet and outlet 24 there is provided a similar outlet 28 which may be connected to a hydraulic bleed valve for a purpose which will be discussed below. If desired, a boot or covering 29 may be provided as shown in FIGURE 1 to protect the seal at the lower end of the strut from dust, dirt, or mud when positioned in operating relationship. For clarity of illustration, the boot 29 is not shown in FIGURE 2.

The lower end of floating piston 12 is provided with an enlarged damper member 12c which has substantially the same outer diameter as the inner diameter of ram 11 and which is positioned to ride in the ram 11. By virtue of restricted orifices or apertures such as 30 and 31 in this enlarged end member, the member 12c acts as a damper or shock absorber in the operation of the strut. By virtue of this arrangement it will be noted that the damping force is in series with the spring force in the strut and that the damping mechanism is an integral part of the hydro-pneumatic strut. Since the damping and the spring forces are in series, the damping force is transmitted through the spring to the chassis and is not transmitted directly to the chassis as it is when the shock absorber is mounted in parallel with the spring. This series arrangement permits the use of critical damping without producing a harsh ride. Critical damping in systems where the damper is in parallel with the spring, on the other hand, produces a harsh ride which is judged intolerable. Thus, sub-critical damping in these conventional systems has necessarily become accepted practice.

In an application of the hydro-pneumatic strut, for example, a strut may be located at each wheel of a vehicle. The chamber 14 of each of these is filled with a compressed gas at a predetermined pressure and sealed through the action of check valve 13 and cap 13d.

In considering the mode of operation of each of the struts, it should be noted that the spring rate of a hydro-pneumatic suspension system supporting a given sprung mass is a function of the volume occupied by the gas and the pressure of the gas such as that in chamber 14. The undamped natural frequency is a function of the spring rate and the sprung mass. Since the pressure required to support the vehicle in the static position can be expressed in terms of the sprung weight or mass, the natural frequency becomes a function of the volume of the gas.

If the sprung mass is reduced by removing a payload, not only will the volume of the gas be increased at the static position, but also the pressure will be reduced. Consequently, the spring rate, in varying from a loaded condition to an unloaded condition, is decreased faster than the sprung mass is decreased. Hence, a vehicle supported by struts using a fixed mass or weight of gas, will ride at a lower frequency when unloaded than when loaded. This is just opposite to the performance of vehicle using conventional suspension systems. Thus, a vehicle designed to carry a heavy dense cargo, could very well carry a bulky but light cargo such as electronic tubes and treat this type of load very gently. Furthermore, such a hydro-pneumatic suspension system provides a lower frequency or softer ride under all conditions than, for example, does a suspension system using linear steel springs.

In considering the operation of the hydro-pneumatic strut of FIGURE 2, reference to the schematic or diagrammatic representation thereof shown in FIGURE 3 is helpful. Inasmuch as the volume of hydraulic fluid maintained in the chamber 18 for any given setting of the main control is constant, this chamber is represented in FIGURE 3 as a closed chamber containing hydraulic fluid. Similarly, chamber 14 is also represented as a closed chamber containing a predetermined volume of gas $v_0$ at a predetermined pressure $p_0$ in the static load condition in which the length of the chamber 14 has a value $l_0$. The ram or plunger 11 is free to move into and out of chamber 18 as displacement forces F are applied to the ram by road bumps or other loading conditions. It will be noted, however, that the area A of the face of the floating piston 12 is greater than the area $A/q$ of the face of the ram 11 by a factor which, for convenience, we may call $q$. In the actual embodiment of FIGURE 2, of course, the effective cross sectional area of the partition means 12a is larger than the effective cross sectional area of the ram means 11 by some factor $q$ so that the differential piston and the partition move only $1/q$ times the distance through which the ram 11 is moved in response to a given displacement force applied thereto. Returning to FIGURE 3, then, for a given displacement $y$ of the ram 11, the floating piston 12 will move some shorter distance $x$ against the gas spring in order to accommodate the volume of hydraulic oil displaced by ram 11. That is to say, the floating piston 12 is a differential piston.

The following analysis, referring to FIGURE 3, may be given for the hydro-pneumatic strut having a fixed mass of gas and a differential piston. The spring constant of the strut shown schematically in FIGURE 3 can be expressed in differential form as follows:

$$k = \frac{dF}{dy} \text{ lb./in.}$$

The differential force dF can be represented by:

$$dF = \frac{A}{q} dp, \text{ hence } k = \frac{A}{q} \frac{dp}{dy}$$

where $q$ is a constant relating the area of the pneumatic piston and the area of the hydraulic piston. From the geometry of the mechanism it is evident that:

$$y : x = A : A/q$$

therefore, $$x = \frac{y}{q}$$

The volume, $v$, occupied by the gas at positions other than the static position can be expressed as follows:

$$v = v_0 - Ax$$

$$= v_0 - A\frac{y}{q}$$

Differentiating this expression, yields $$\frac{dv}{dy} = -\frac{A}{q}$$

As the hydraulic piston moves with wheel movement, the pressure $p$, in the pneumatic portion of the strut will vary according to the following equation:

$$pv^n = p_0 v_0^n$$

$$p = \frac{p_0 v_0^n}{v^n}$$

Differentiating with respect to $y$, $$\frac{dp}{dy} = p_0 v_0^n (-n) v^{-(n+1)} \frac{dv}{dy}$$

or $$\frac{dp}{dy} = \frac{np_0 l_0^n}{q^{n+1}}$$

Recalling that $$k = \frac{A}{q}\frac{dp}{dy}$$

$$k = \frac{nl_0^n p_0 A}{q^2 l^{n+1}}$$

To support the vehicle, the pressure in the strut in the static position must be:

$$p_0 = q\frac{F}{A}$$

and the spring constant can now be written as:

$$k = \frac{nl_0^n F}{ql^{n+1}}$$

For convenience let $$r = \frac{\text{wheel movement}}{\text{strut movement}} = \frac{\text{strut load}}{\text{wheel load}} = \frac{F}{W}$$

Hence, the strut load will be $$F = rW$$

and $$k = \frac{nl_0^n rW}{ql^{n+1}}$$

In the actual suspension system the ratio of wheel movement to strut movement varies for different positions of the wheel. For purposes of illustration, however, let it be assumed that ratio "$r$" remains constant throughout the total wheel travel. The spring constant at the wheel will equal $$k_{\text{wheel}} = \frac{l}{r^2}k = \frac{nl_0^n W}{rql^{n+1}}$$

The familiar equation for undamped natural frequency is $$f = \frac{60}{2\pi}\sqrt{\frac{k_{\text{wheel}}}{W/g}}$$

where $W$, of course, represents the sprung weight supported by one wheel. Substituting the value of $k_{\text{wheel}}$ in the frequency equation:

$$f = \frac{60}{2\pi}\sqrt{\frac{gnl_0^n}{rql^{(n+1)}}}$$

By way of example, if $n = 1.35$ (a representative value for polytropic compression and expansion)
$g = 386$ in./sec.$^2$
$r = 2$
$q = 2$ the formula for undamped frequency reduces to:

$$f = \frac{60}{2\pi}\sqrt{\frac{386 \times 1.35}{2 \times 2}}\sqrt{\frac{l_0^{1.35}}{l^{2.35}}}$$

or $$f = 109\frac{l_0^{0.675}}{l^{1.175}} \text{ cycles/min.}$$

The above equation lends itself to a log-log plot. A family of curves of straight lines with a negative slope equal to 1.175 for various $l_0$'s provides information necessary for the preliminary determination of the dimensions of the hydro-pneumatic strut. Once the strut length is selected on the basis of the natural frequency desired, it can be layed out in the suspension system and the actual load deflection curves can then be computed.

A typical load-deflection curve for a front wheel suspension using the hydro-pneumatic strut of the present invention is plotted in FIGURE 4.

In FIGURE 4 the wheel position in inches from a central static position corresponding to a length $l_0$ for chamber 14 is plotted as abscissa against the wheel load in pounds applied to the strut plotted as ordinate. The solid line curve 40 represents the characteristics of the hydro-pneumatic strut under loaded conditions of the vehicle whereas the solid line curve 41 represents the characteristics of the hydro-pneumatic strut under unloaded conditions. By way of comparison, the dash line curve 42 represents the characteristics of a torsion bar suspension system. It will be noted that full wheel travel, five inches jounce and 4.5 inches rebound, for example, is afforded and in fact this can be maintained under all load conditions. Further, the non-linear characteristic of pneumatic springs provides a soft ride for small wheel deflection. While for larger wheel movements the spring rate increases rapidly preventing strike through to the stops. This feature reduces the shock loading of the vehicle structure and the cargo.

Also, as has been noted above, the shock absorbing or damping mechanism is an integral part of the hydro-pneumatic strut being achieved by circulation of the hydraulic oil through the restricted orifices in the damper member 12c on the end of the floating piston 12. This of course eliminates the need for and the total weight of separate shock absorbers. Further, it should be noted that the damping mechanism is in series with the differential piston and the pneumatic spring portion of the strut. Thus, the damping force is transmitted through the spring to the chassis and not transmitted directly to the chassis as it is when the shock absorber is mounted in parallel with the spring.

The undamped natural frequency of a typical embodiment of the hydro-pneumatic suspension drops to about 45 cycles per minute for the rear of a truck in the unloaded condition. One might therefore expect that a single passenger riding in the cargo area when the truck is light would experience seasickness. Experience in low rate hydro-pneumatic suspensions with the hydro-pneumatic strut of the present invention including the series damper and essentially critical damping has however shown that one oscillation at a low frequency does not produce the sensation of nausea.

While the principles of the invention have now been made clear, there will be immediately obvious to those skilled in the art many modifications in structure, arrangement, proportions, the elements and components used in the practice of the invention and otherwise, which are particularly adapted for specific environments and operating requirements without departing from those principles. The appended claims are therefore intended to cover and embrace any such modifications within the limits only of the true spirit and scope of the invention.

We claim as our invention:

1. A hydro-pneumatic strut comprising a housing, a floating differential piston in said housing having a partition member at one end thereof and a damping member at the other end thereof, said partition member dividing the interior of said housing into a first chamber on one side of said partition member and a second chamber on the other side of said partition member, gas inlet means in said housing charging said first chamber with a predetermined mass of gas, whereby movement of said floating differential piston in said housing in one direction will compress the gas in said first chamber, a ram member received in the end of said housing movable into and out of said second chamber, said ram member having a cylinder formed therein opening into said second chamber and receiving said damping member, said damping member having restricted passage means, and hydraulic inlet means in said housing charging said second chamber and said ram cylinder completely full of liquid.

2. A hydro-pneumatic strut comprising a cylindrical housing, means to attach a first end of said housing to a mass to be sprung, a floating differential piston in said housing having a partition member at one end thereof and a damping member at the other end thereof, said partition member dividing the interior of said housing into a first chamber on one side of said partition member and a second chamber on the other side of said partition member, gas inlet means in said housing charging said first chamber with a predetermined mass of gas, whereby movement of said floating differential piston in said housing in one direction will compress the gas in said first chamber, a ram member received in the end of said housing movable into and out of said second chamber, said ram member having a cylinder formed therein opening into said second chamber and receiving said damping member, said damping member having restricted passage means through which liquid may flow, means to attach said ram means to a member upon which said sprung mass is to be supported, and hydraulic inlet means in said housing to charge said second chamber and said ram cylinder completely full of liquid, the effective cross-sectional area of said partition member being $q$ times as large as the effective cross-sectional area of said ram member so that in response to a force applied to said ram member said floating differential piston and said partition member moves relative to the housing only $1/q$ times the length through which said ram member is moved, the relative movement between said ram member and said floating differential piston operating to displace liquid through said restricted passage means.

References Cited in the file of this patent
UNITED STATES PATENTS

| | | |
|---|---|---|
| 1,918,697 | Gruss | July 18, 1933 |
| 2,363,485 | Down | Nov. 28, 1944 |
| 2,389,849 | Gruss | Nov. 27, 1945 |
| 2,554,581 | Levy | May 29, 1951 |
| 2,873,963 | Taylor | Feb. 17, 1959 |